(12) United States Patent
Ishimoto

(10) Patent No.: US 9,970,834 B2
(45) Date of Patent: May 15, 2018

(54) TORQUE SENSOR AND ELECTRIC POWER STEERING SYSTEM

(71) Applicant: JTEKT CORPORATION, Osaka-shi, Osaka (JP)

(72) Inventor: Yutaro Ishimoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 83 days.

(21) Appl. No.: 14/733,086

(22) Filed: Jun. 8, 2015

(65) Prior Publication Data
US 2015/0369679 A1　Dec. 24, 2015

(30) Foreign Application Priority Data

Jun. 18, 2014　(JP) ................................. 2014-125228

(51) Int. Cl.
*G01L 3/00*　(2006.01)
*G01L 3/10*　(2006.01)

(52) U.S. Cl.
CPC ............... *G01L 3/101* (2013.01); *G01L 3/104* (2013.01)

(58) Field of Classification Search
CPC ......... G01L 3/101; G01L 3/104; G01R 33/07; G01R 33/0047; G01R 33/072; G01R 33/0011
USPC .......................... 73/862.331, 862.333; 92/62
See application file for complete search history.

(56) References Cited

U.S. PATENT DOCUMENTS

| 2006/0021451 A1* | 2/2006 | Ishihara et al. ........... B62D 6/10 73/862.331 |
| 2010/0312082 A1* | 12/2010 | Batman et al. ....... A61B 5/0002 600/365 |
| 2011/0127394 A1* | 6/2011 | Sun ...................... G11B 33/124 248/201 |

(Continued)

FOREIGN PATENT DOCUMENTS

| EP | 1840546 A2 | 10/2007 |
| EP | 2133677 A1 | 12/2009 |
| JP | 2011-191094 A | 9/2011 |

OTHER PUBLICATIONS

Author: unknown, Title: Linear Hall-Effect IC AH49E, Date: Aug. 2010, Publisher: BCD Semiconductor Manufacturing Limited, Rev. 1.3, Total pp. 10.*

(Continued)

*Primary Examiner* — Lisa Caputo
*Assistant Examiner* — Roger Hernandez-Prewit
(74) *Attorney, Agent, or Firm* — Oliff PLC

(57) ABSTRACT

A torque sensor includes a pair of magnetic yokes arranged in a magnetic field from a multipolar magnet that rotates integrally with, for example, a first shaft, and the magnetic yokes rotate integrally with, for example, a second shaft. The torque sensor includes magnetic collecting elements magnetically coupled to the respective magnetic yokes and a magnetic flux detecting element. The magnetic collecting elements have a pair of magnetic collecting portions (magnetic collecting protrusions) facing each other. The magnetic flux detecting element includes a circuit board with a cutout formed therein and a Hall IC having a Hall element arranged between the magnetic collecting portions, and the Hall IC is mounted parallel to the circuit board so as to extend over the cutout. At least a part of one of the magnetic collecting portions is arranged in the cutout.

9 Claims, 7 Drawing Sheets

(56) References Cited

U.S. PATENT DOCUMENTS

2011/0221432 A1      9/2011  Oota
2012/0055578 A1*     3/2012  Kodi ..................... B21F 15/04
                                                          140/149

OTHER PUBLICATIONS

Nov. 17, 2015 Extended Search Report issued in European Patent Application No. 15171713.9. European Patent Office, pp. 8.

* cited by examiner

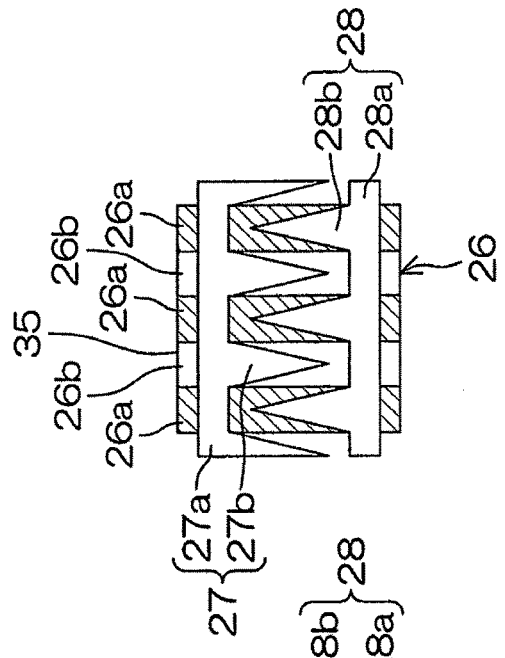
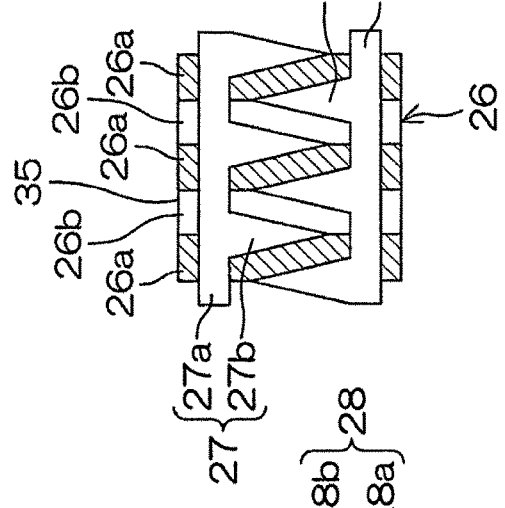
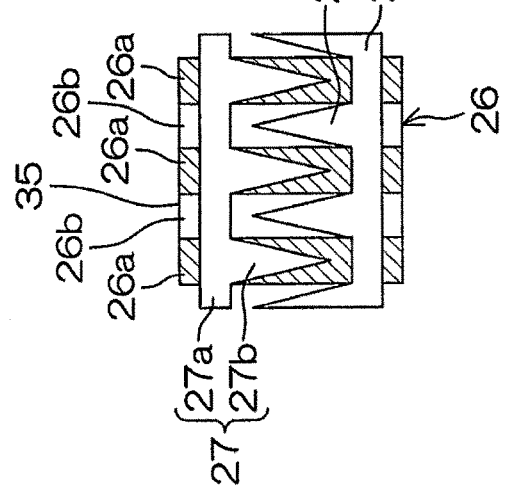

TORQUE SENSOR AND ELECTRIC POWER STEERING SYSTEM

INCORPORATION BY REFERENCE

The disclosure of Japanese Patent Application No. 2014-125228 filed on Jun. 18, 2014 including the specification, drawings and abstract, is incorporated herein by reference in its entirety.

BACKGROUND OF THE INVENTION

1. Field of the Invention

The present invention relates to a torque sensor and an electric power steering system.

2. Description of Related Art

In general, a torque detecting apparatus includes a Hall IC arranged between protruding portions protruding radially outward from ring portions of two, upper and lower magnetic collecting rings, and detects a change in generated torque as a change in a magnetic flux passing through the Hall IC. For a reduction in the thickness of a sensor unit used for the torque detecting apparatus, a technique has been developed in which a Hall IC used for torque detection is mounted on a printed circuit board such that a device portion of the Hall IC is generally parallel to the printed circuit board (see Japanese Patent Application Publication No. 2011-191094 (JP 2011-191094 A)).

Since the Hall IC mounted on the printed circuit board is arranged between the protruding portions (magnetic collecting portions) of the pair of magnetic collecting rings, the distance between the magnetic collecting portions of the pair of magnetic collecting portions tends to increase. An increased distance between the magnetic collecting portions of the pair of magnetic collecting portions progressively reduces the density of a magnetic flux passing through the Hall IC, thus progressively reducing detection accuracy. The reason is that the magnetic flux density is in inverse proportion to the square of the distance. JP 2011-191094 A describes a technique in which the device portion of the Hall IC is arranged in association with a cutout portion of the printed circuit board to improve permeability of the magnetic flux when the magnetic flux passes through the device portion of the Hall IC. However, the printed circuit board itself is originally not so low in the permeability of the magnetic flux. Therefore, the effect that significantly increases the magnetic flux density is not expected to be obtained simply by forming the cutout portion corresponding to the device portion of the Hall IC.

SUMMARY OF THE INVENTION

An object of the present invention is to provide a torque sensor and an electric power steering system that allow a high magnetic flux density to be detected and achieve high detection accuracy.

A torque sensor according to an aspect of the present invention includes: a cylindrical multipolar magnet that rotates integrally with one of a first shaft and a second shaft coaxially arranged; a pair of magnetic yokes arranged in a magnetic field from the multipolar magnet and rotating integrally with the other of the first shaft and the second shaft; a pair of magnetic collecting elements each including at least one magnetic collecting portion, the magnetic collecting elements provided with at least a set of the magnetic collection portions that is formed of a pair of the magnetic collecting portions facing each other, and the magnetic collecting elements each magnetically coupled to corresponding one of the pair of magnetic yokes; and a magnetic flux detecting element including a circuit board with a cutout formed therein and a Hall IC that includes a Hall element arranged between the magnetic collecting portions, the Hall IC mounted parallel to the circuit board so as to extend over the cutout, the magnetic flux detecting element detecting a magnetic flux between the magnetic collecting portions. In the torque sensor, at least a part of one of the magnetic collecting portions is arranged in the cutout.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 4A to 4C are diagrams each illustrating a circumferential positional relationship between a multipolar magnet and magnetic yokes, in which FIG. 4B depicts an assembled state and FIGS. 4A and 4C depict states where a phase changes from the state in FIG. 4B in opposite directions;

DETAILED DESCRIPTION OF EMBODIMENTS

An embodiment that embodies the present invention will be described with reference to the drawings.

Figure 1:
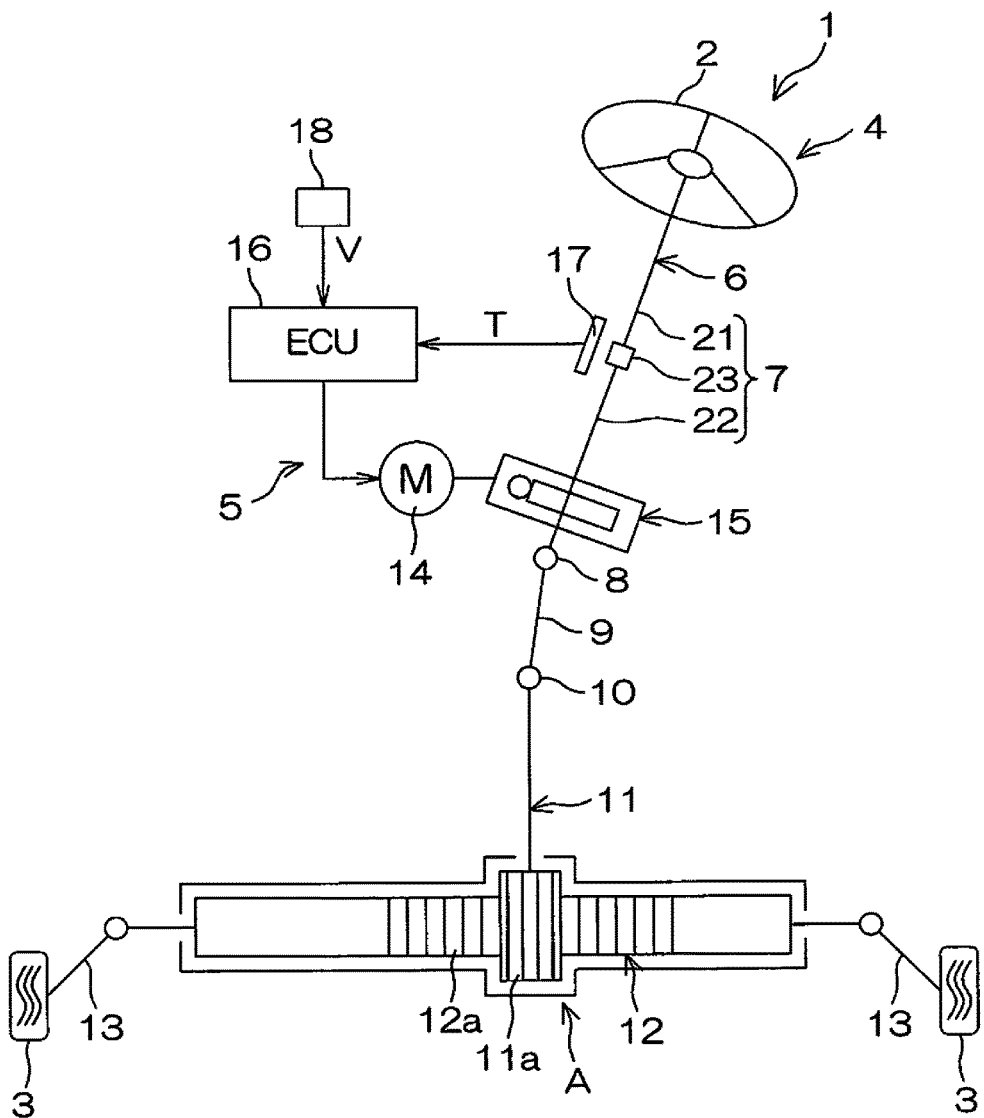
FIG. 1 is a schematic diagram of an electric power steering system including a torque sensor in an embodiment of the present invention, depicting a general configuration of the electric power steering system.

As depicted in FIG. 1, an electric power steering system 1 includes a steering mechanism 4 and an assist mechanism 5. The steering mechanism 4 turns turning wheels 3 based on a driver's operation of a steering wheel 2 (steering member). The assist mechanism 5 assists the driver's steering operation.

The steering mechanism 4 includes a steering shaft 6 serving as a rotating shaft of the steering wheel 2. The steering shaft 6 includes a column shaft 7, an intermediate shaft 9, and a pinion shaft 11. The column shaft 7 is coupled to the center of the steering wheel 2. The intermediate shaft 9 is coupled to one end (axially lower end) of the column shaft 7 via a universal joint 8. The pinion shaft 11 is coupled to one end (axially lower end) of the intermediate shaft 9 via a universal joint 10.

A pinion 11a is provided at an axially lower end of the pinion shaft 11. The steering mechanism 4 includes a rack shaft 12 on which a rack 12a meshing with the pinion 11a is formed. The pinion 11a and the rack 12a form a rack and pinion mechanism A that is a motion converting mechanism. The steering shaft 6 rotates in conjunction with the driver's steering operation. This rotary motion is converted via the rack and pinion mechanism A into reciprocating linear motion in an axial direction of the rack shaft 12. The reciprocating linear motion of the rack shaft 12 is transmitted to the turning wheels 3 via tie rods 13 coupled to opposite ends of the rack shaft 12. Thus, a turning angle of the turning wheels 3 changes to change a traveling direction of a vehicle.

The assist mechanism 5 includes an electric motor 14, a gear mechanism 15, and an electronic control unit (ECU) 16. The electric motor 14 applies an assist torque to the column shaft 7. The gear mechanism 15 transmits rotation of the electric motor 14 to the column shaft 7. The ECU 16 controls operation of the electric motor 14. The rotation of the electric motor 14 is transmitted to the column shaft 7 via the gear mechanism 15 to apply a motor torque to the steering shaft 6, assisting the steering operation.

In the electric power steering system 1, the column shaft 7 is provided with a torque sensor 17 that detects a torque (steering torque) T applied to the steering shaft 6 when the driver performs a steering operation. The vehicle is provided with a vehicle speed sensor 18 that detects a traveling speed V of the vehicle. The ECU 16 sets a target assist force based on the detected steering torque T and the detected vehicle speed V. The ECU 16 performs feedback control on a current supplied to the electric motor 14 so that the assist torque applied by the electric motor 14 to the column shaft 7 is equal to the target assist torque.

Figure 2:
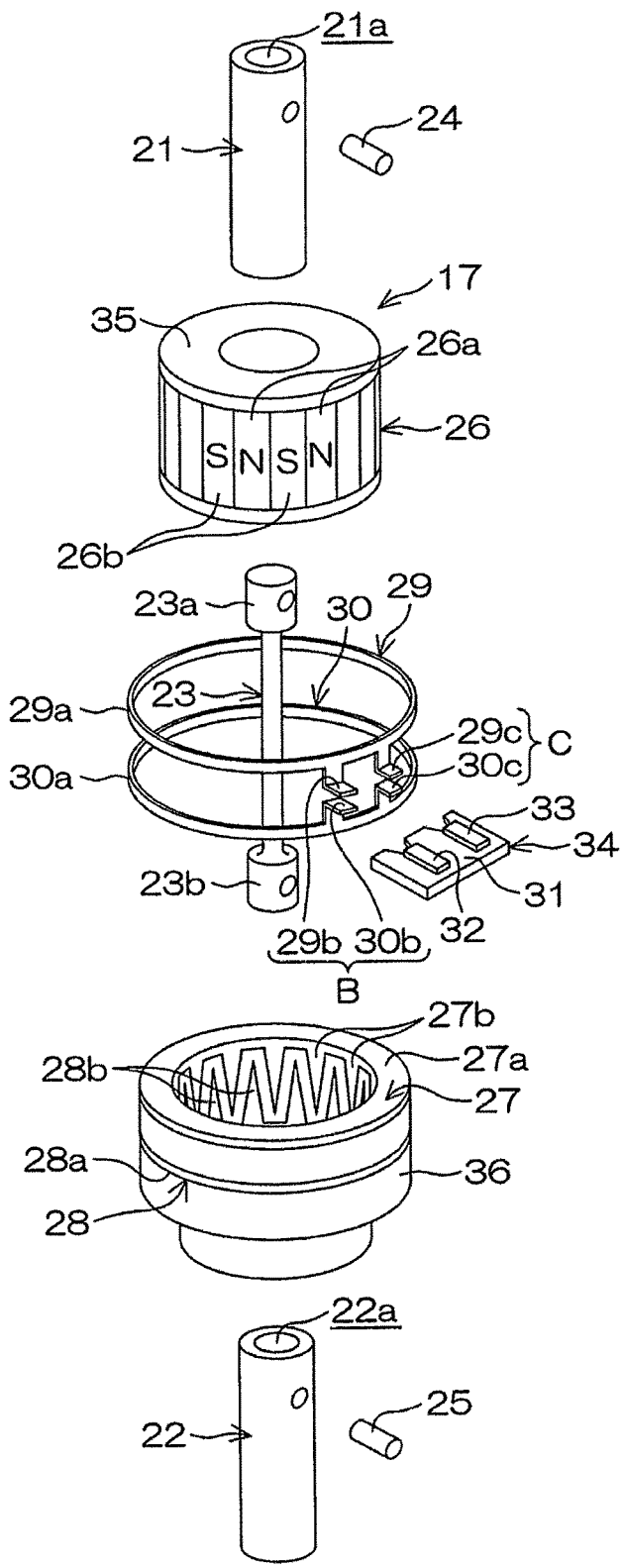
FIG. 2 is an exploded perspective view of the torque sensor.
Figure 3:
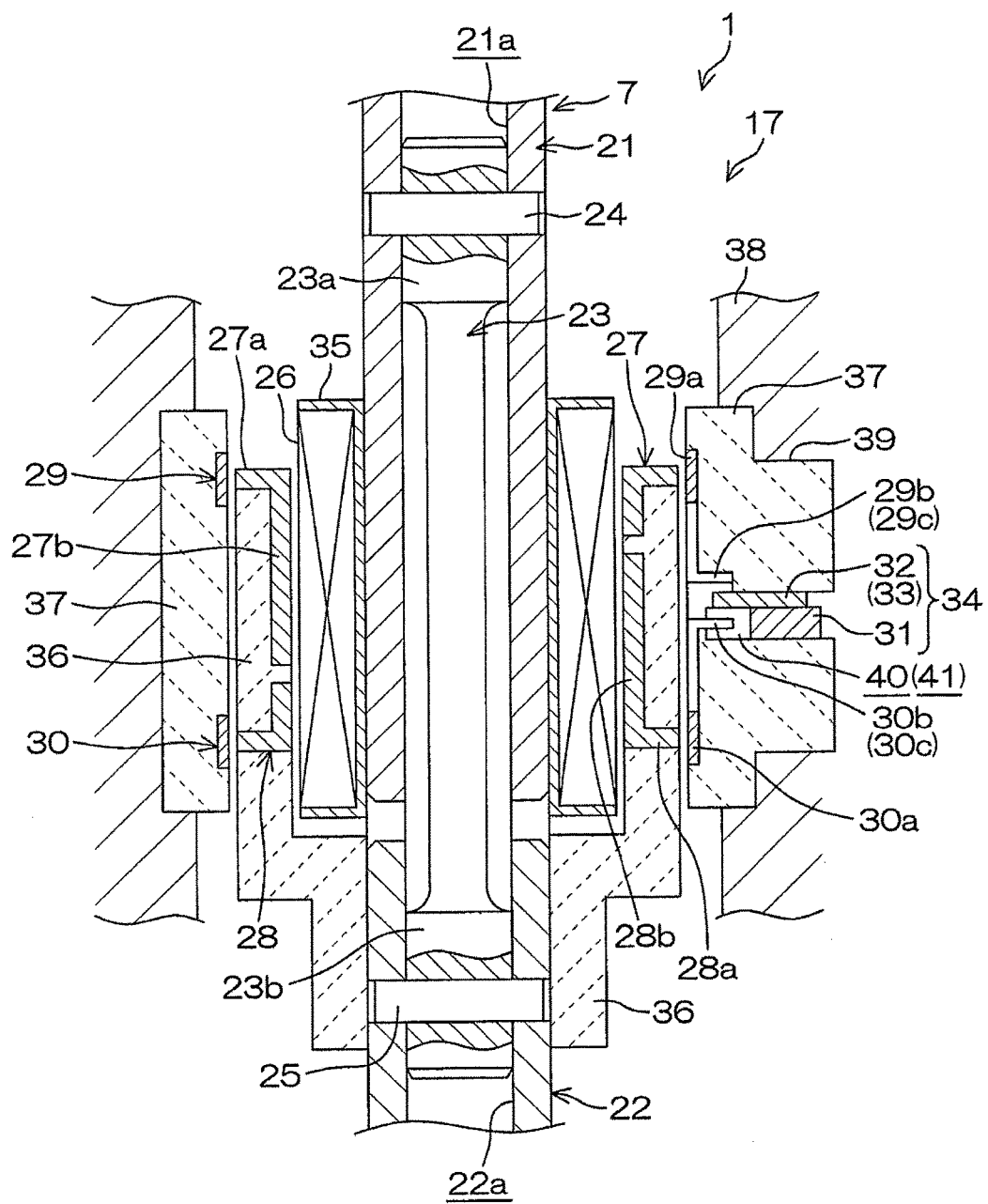
FIG. 3 is a cross-sectional view of an important part of the electric power steering system.

FIG. 2 is an exploded perspective view of the torque sensor 17. FIG. 3 is a cross-sectional view of an important part of the electric power steering system. As seen in FIG. 2 and FIG. 3, the column shaft 7 includes a first shaft 21, a second shaft 22, and a torsion bar 23. The first shaft 21 is an input shaft coupled to the steering wheel 2. The second shaft 22 is an output shaft coupled to the intermediate shaft 9. The torsion bar 23 coaxially couples the first shaft 21 and the second shaft 22 together.

Specifically, a first end 23a of the torsion bar 23 is fitted into a coupling hole 21a formed in a shaft center portion of the first shaft 21 and coupled to the first shaft 21 with a pin 24. A second end 23b of the torsion bar 23 is fitted into a coupling hole 22a formed in a shaft center portion of the second shaft 22 and coupled to the second shaft 22 with a pin 25. When the steering torque T is applied to the first shaft 21 in conjunction with the operation of the steering wheel 2, the torsion bar 23 is torsionally deformed during transmission of the steering torque T to the second shaft 22 via the torsion bar 23. Thus, relative rotational displacement according to the steering torque T occurs between the first shaft 21 and the second shaft 22.

The torque sensor 17 includes a cylindrical multipolar magnet 26 and a pair of magnetic yokes 27 and 28. The multipolar magnet 26 rotates integrally with the first shaft 21. The magnetic yokes 27 and 28 are arranged in a magnetic field from the multipolar magnet 26 and rotate integrally with the second shaft 22. The torque sensor 17 also includes a pair of magnetic collecting elements 29 and 30 and a magnetic flux detecting element 34. The magnetic collecting elements 29 and 30 are magnetically coupled to the pair of magnetic yokes 27 and 28, respectively. The magnetic flux detecting element 34 includes two Hall ICs 32 and 33 mounted on a circuit board 31 and a circuit board 31.

The multipolar magnet 26 is a cylindrical magnet coupled to a first end of the first shaft 21 so as to be able to rotate integrally with the first shaft 21. N poles 26a and S poles 26b are alternately arranged in the multipolar magnet 26 in a circumferential direction thereof. The multipolar magnet 26 is held by a holding cylinder 35 formed of resin. The multipolar magnet 26 is fitted around and fixed to an outer periphery of the first shaft 21 via the holding cylinder 35. An axis of the multipolar magnet 26 coincides with an axis of the first shaft 21.

The pair of magnetic yokes 27 and 28 is formed of soft magnetic body arranged radially outside the multipolar magnet 26. The pair of magnetic yokes 27 and 28 is coupled to a first end of the second shaft 22 so as to be able to rotate integrally with the second shaft 22, and rotates relatively to the multipolar magnet 26. The magnetic yokes 27 and 28 include ring-like yoke main bodies 27a and 28a and pawls 27b and 28b, respectively. The yoke main bodies 27a and 28a are located facing and separated away from each other in an axial direction of the first shaft 21 and the second shaft 22. The pawls 27b and 28b extend in the axial direction from inner peripheries of the yoke main bodies 27a and 28a, respectively, and are arranged at regular intervals in a circumferential direction of the yoke main bodies 27a and 28a.

The pair of magnetic yokes 27 and 28 is molded and held in a holding cylinder 36 formed of resin so that the pawls 27b and 28b are alternately arranged in the circumferential direction facing each other so as to be mutually displaced with appropriate gaps therebetween. The holding cylinder 36 is fitted around and fixed to an outer periphery of the first end of the second shaft 22.

The pawls 27b and 28b exposed to the inside of the holding cylinder 36 face an outer peripheral surface of the multipolar magnet 26 via a slight air gap as depicted in FIG. 3.

FIGS. 4A to 4C are diagrams each illustrating the positional relationship between the multipolar magnet 26 and the magnetic yokes 27 and 28. FIG. 4B depicts the positional relationship between the multipolar magnet 26 and the magnetic yokes 27 and 28 in an assembled state (the positional relationship observed when the torsion bar 23 is not twisted and no relative angular displacement occurs between the first shaft 21 and the second shaft 22). The magnetic yokes 27 and 28 and the multipolar magnet 26 are assembled together so as to align with one another in the circumferential direction so that each of the pawls 27b and 28b of the magnetic yokes 27 and 28 coincides sequentially with the boundary between the corresponding N pole 26a and S pole 26b arranged on the periphery of the multipolar magnet 26. This alignment is achieved by adjusting the circumferential positions of the multipolar magnet 26 and the magnetic yokes 27 and 28 along with both first shaft 21 and second shaft 22 when the first shaft 21 and the second shaft 22 are coupled together with the torsion bar 23.

Such assembly allows each of the pawls 27b and 28b of the magnetic yokes 27 and 28 to be positioned, under identical conditions, in a magnetic field formed between the adjacent N pole 26a and S pole 26b on the periphery of the multipolar magnet 26. An identical magnetic flux is generated in the yoke main bodies 27a and 28a that couples bases of the pawls 27b and 28b, respectively. As seen in FIG. 3, the pair of magnetic collecting elements 29 and 30 is arranged at a predetermined distance from the corresponding magnetic yokes 27 and 28 so as to surround the peripheries of the corresponding magnetic yokes 27 and 28. Each of the magnetic collecting elements 29 and 30 is formed of a soft magnetic body. The magnetic collecting elements 29 and 30 are held by a holding cylinder 37 formed of resin.

The electric power steering system 1 includes a tubular housing 38 through which the column shaft 7 is inserted. The holding cylinder 37 is fitted on and fixed to an inner periphery of the housing 38. The magnetic collecting elements 29 and 30 are fixed to the housing 38 via the holding cylinder 37. The present embodiment will be described based on a case where the magnetic collecting elements 29 and 30 are shaped like rings surrounding the peripheries of the corresponding magnetic yokes 27 and 28. However, the magnetic collecting elements 29 and 30 may each be shaped like a circular arc (not depicted in the drawings) surrounding a part of the corresponding one of the magnetic yokes 27 and 28 in the circumferential direction, for example.

As depicted in FIG. 2 and FIG. 3, the magnetic collecting element 29 (30) includes a ring-like magnetic collecting element main body 29a (30a) and magnetic collecting protrusions 29b and 29c (30b and 30c). The magnetic collecting protrusions 29b and 29c (30b and 30c) are two magnetic collecting portions extending in the axial direction from two circumferentially separate positions on the magnetic collecting element main body 29a (30a) and bent radially outward at tip portions of the magnetic collecting protrusions.

Each of the magnetic collecting elements 29 and 30 is formed of a press molded product. The magnetic collecting protrusions 29b and 29c (30b and 30c) of the magnetic collecting element 29 (30) are formed by bending the magnetic collecting element main body 29a (30a).

As depicted in FIG. 2, a set B is formed by the magnetic collecting protrusion 29b of the magnetic collecting element 29 and the magnetic collecting protrusion 30b of the magnetic collecting element 30, which face each other in the axial direction. Further, a set C is formed by the magnetic collecting protrusion 29c of the magnetic collecting element 29 and the magnetic collecting protrusion 30c of the magnetic collecting element 30, which face each other in the axial direction. If relative angular displacement occurs between the first shaft 21, to which the multipolar magnet 26 is fixed, and the second shaft 22, to which the magnetic yokes 27 and 28 are fixed, with the torsion bar 23 twisted, then the phase of the pawls 27b and 28b of the magnetic yokes 27 and 28 and the phase of the N poles 26a and S poles 26b of the multipolar magnet 26 change in opposite directions as depicted in FIG. 4A and FIG. 4B.

When such a phase change occurs, the number of lines of magnetic force with a certain polarity increases in the pawls 27b of the magnetic yoke 27 and the number of lines of magnetic force with an opposite polarity increases in the pawls 28b of the magnetic yoke 28. Thus, the positive magnetic flux and the negative magnetic flux are generated in the yoke main bodies 27a and 28a. The positivity and negativity of the magnetic fluxes generated at this time are determined by the relative angular displacement occurring between the multipolar magnet 26 and the magnetic yokes 27 and 28, that is, between the first shaft 21 and the second shaft 22. The density of the positive and negative magnetic fluxes corresponds to the magnitude of the relative angular displacement.

Figure 5:
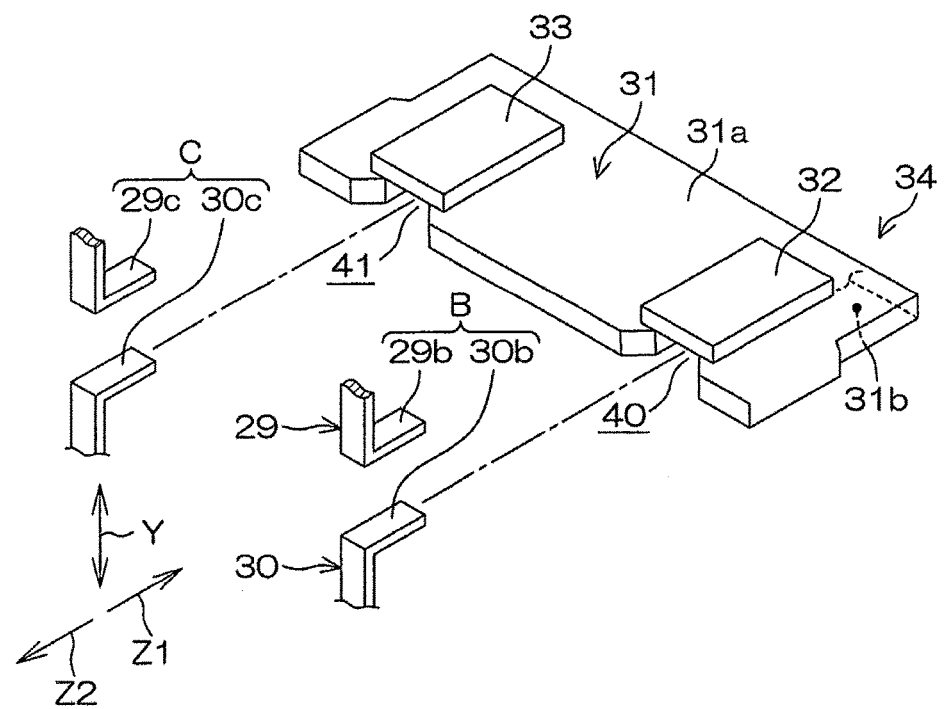
FIG. 5 is an exploded perspective view of magnetic collecting protrusions and a magnetic flux detecting element.
Figure 6:
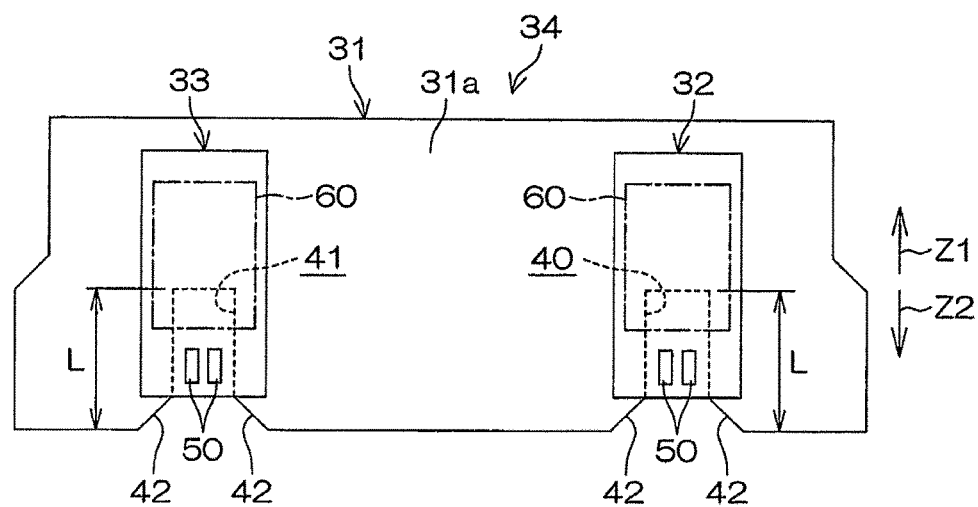
FIG. 6 is a plan view of the magnetic flux detecting element.
Figure 7A:
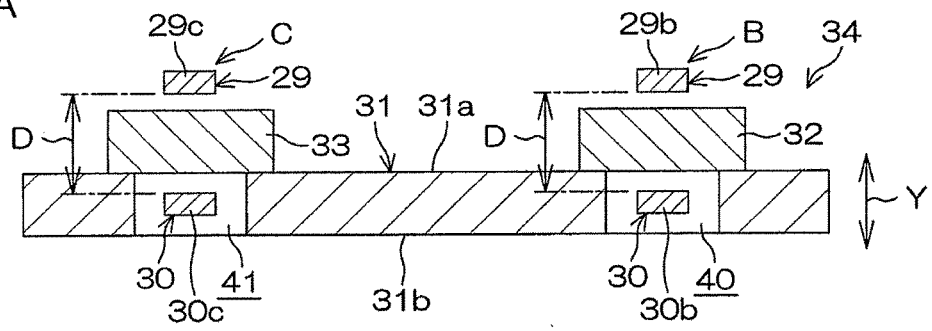
FIG. 7A is a schematic sectional view of the magnetic collecting protrusions and the magnetic flux detecting element.
Figure 7B:
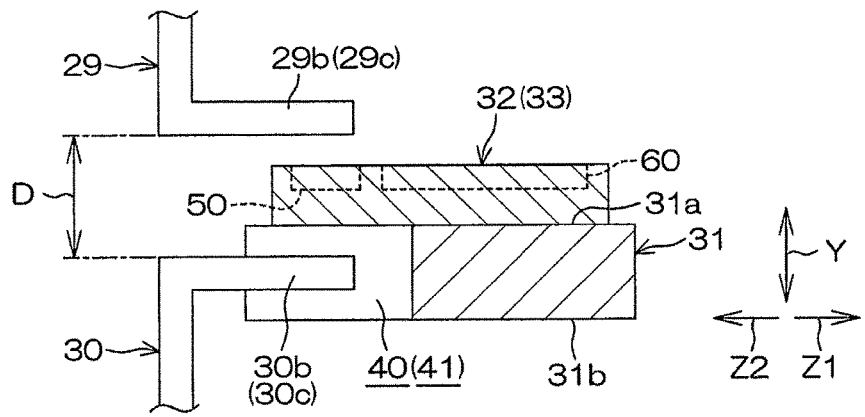
FIG. 7B is a sectional view taken along line 7B-7B in FIG. 7A, in which both figures depict a positional relationship between the magnetic flux detecting element and the magnetic collecting protrusions.

Now, the magnetic flux detecting element 34 will be described. FIG. 5 is an exploded perspective view of the magnetic collecting protrusions and the magnetic flux detecting element. FIG. 6 is a plan view of the magnetic flux detecting element. FIGS. 7A and 7B are schematic sectional views of the magnetic collecting protrusions and the magnetic flux detecting element. FIG. 7A and FIG. 7B are sectional views taken at different angles.

As depicted in FIG. 3 and FIG. 7A, the magnetic flux detecting element 34 includes a circuit board 31, a Hall IC 32, and a Hall IC 33. The Hall IC 32 is mounted on the circuit board 31 and partly arranged between the magnetic collecting protrusions 29b and 30b of the set B. The Hall IC 33 is mounted on the circuit board 31 and partly arranged between the magnetic collecting protrusions 29c and 30c of the set C. The Hall IC 32 detects a magnetic flux between the magnetic collecting protrusions 29b and 30b. The Hall IC 33 detects a magnetic flux between the magnetic collecting protrusions 29c and 30c.

As depicted in FIG. 3, the magnetic flux detecting element 34 is supported by a support portion 39 provided on a part of an outer periphery of the holding cylinder 37 so as to protrude outward. As depicted in FIG. 5 and FIG. 6, the circuit board 31 is shaped generally like a rectangle. The circuit board 31 defines a pair of cutouts 40 and 41 extending parallel to each other. As depicted in FIG. 6, flank faces 42 defined by chamfers are formed at an inlet of each of the cutouts 40 and 41. As depicted in FIG. 5 and FIG. 7A, the Hall IC 32 is mounted on the circuit board 31 so as to extend over the cutout 40. The Hall IC 33 is mounted on the circuit board 31 so as to extend over the cutout 41.

The circuit board 31 has a first surface 31a and a second surface 31b that are on the opposite sides of the circuit board 31 in a board thickness direction Y. The pair of Hall ICs 32 and 33 are mounted on the first surface 31a of the circuit board 31, that is, the same surface of the circuit board 31. As depicted in FIG. 6, the Hall ICs 32 and 33 are packaged into a Hall IC circuit board. Each of the Hall ICs 32 and 33 includes a pair of Hall elements 50 and a signal processing section 60. The Hall elements 50 each face the corresponding one of the cutouts 40 and 41. The signal processing section 60 processes signals received from the Hall elements 50 and outputs the processed signals. FIG. 6 depicts arrangement areas (mounting areas) of the Hall elements 50 on the Hall IC circuit board forming each of the Hall ICs 32 and 33, and an arrangement area (mounting area) of the signal processing section 60.

Figure 8:
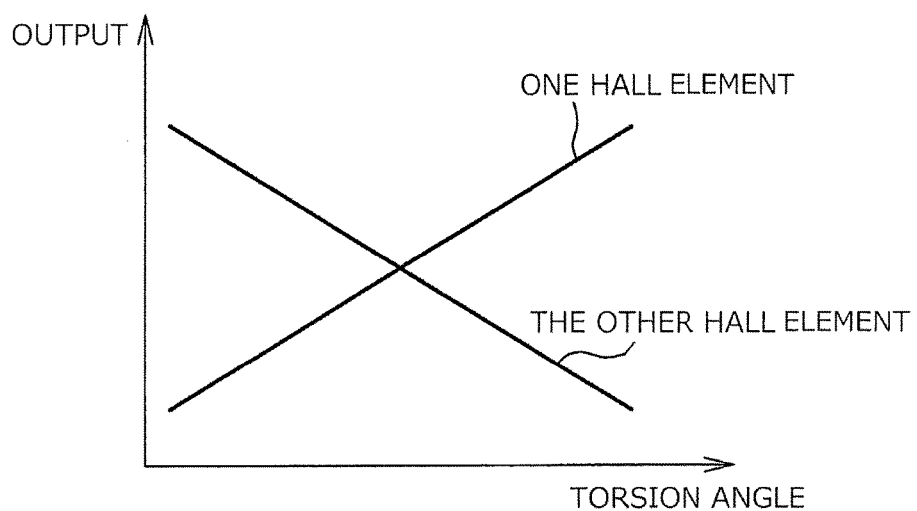
FIG. 8 is a characteristic diagram illustrating a relationship between a torsion angle of a torsion bar and detection properties of two Hall elements.

In each of the Hall ICs 32 and 33, the two Hall elements 50 exhibit the following characteristics regarding detection signals (output voltage). That is, as depicted in FIG. 8, output from one of the Hall elements 50 increases and output from the other Hall element 50 decreases as the torsion angle of the torsion bar 23 increases, and a cross waveform is exhibited in which a line indicating the output from one of the Hall elements 50 crosses a line indicating the output from the other Hall element 50 at such a position that no torsion angle is generated in the torsion bar 23. As depicted in FIG. 6 and FIG. 7B, in each of the Hall ICs 32 and 33, the pair of Hall elements 50 is arranged more toward an opening direction Z2 side of the corresponding one of the cutouts 40 and 41, which is the opposite side of the corresponding one of the cutouts 40 and 41 from a depth direction Z1 side. Further, at least a part of the signal processing section 60 faces the first surface 31a of the circuit board 31.

Figure 9:
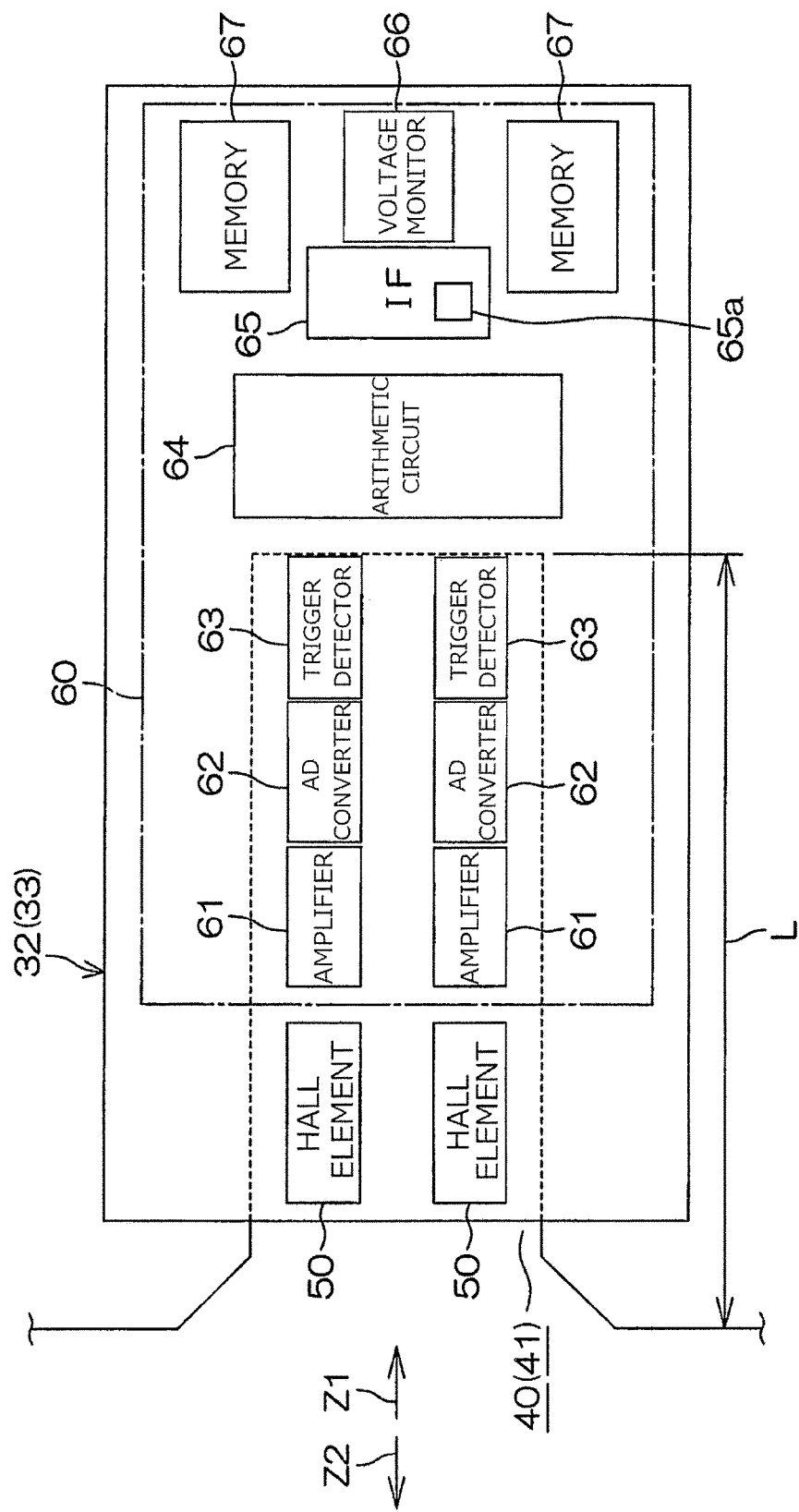
FIG. 9 is a plan view of a Hall IC partly extending over a cutout in a circuit board and a periphery of the Hall IC, schematically depicting arrangement areas (mounting areas) of elements of the Hall IC.

FIG. 9 schematically depicts arrangement areas (mounting areas) of elements on the Hall IC circuit board forming each of the Hall ICs 32 and 33. In the signal processing section 60, a pair of amplifiers 61, a pair of AD converter 62, a pair of trigger detector 63, an arithmetic circuit 64, an interface 65, a voltage monitor 66, and a memory 67 are arranged in arrangement areas (mounting areas) schematically depicted in FIG. 8.

Each of the amplifiers 61 amplifies a voltage signal output from the corresponding Hall element 50. Each of the AD converters 62 converts an analog signal received from the corresponding amplifier 61 into a digital signal.

Each of the trigger detectors 63 provides a function to determine, based on an input trigger voltage signal, whether to output to the AD converter 62 an request (instruction signal) requesting the AD converter 62 to output the digital output signal to the arithmetic circuit 64, or to access the memory 67.

The arithmetic circuit 64 executes arithmetic processing on the input digital signal. The interface 65 includes a regulator 65a and an electrostatic discharge (ESD) protection circuit (not depicted in the drawings). The regulator 65a sets an input voltage to a constant voltage that is a predetermined voltage corresponding to the Hall element 50.

The voltage monitor 66 outputs an error signal to the ECU 16 when an output voltage from the regulator 65a in the interface 65 falls outside a normal range. The memory 67 includes, for example, an electrically erasable programmable read only memory (EEPROM), and stores various types of information needed for signal processing.

In the torque sensor 17, when the steering torque T is input to the first shaft 21 to cause relative rotary displacement between the first shaft 21 and the second shaft 22, the positional relationship between the multipolar magnet 26 and the two magnetic yokes 27 and 28 changes, thus changing magnetism collected by the yokes 27 and 28. Consequently, the intensity of magnetism applied to each of the Hall ICs 32 and 33 changes to cause a signal according to the relative rotary displacement between the first shaft 21 and the second shaft 22 to be output from each of the Hall ICs 32 and 33 to the ECU 16. In other words, a signal according to the torsion angle of the torsion bar 23 is output from each of the Hall ICs 32 and 33 to the ECU 16. Specifically, the two Hall elements 50 provided for each of the Hall ICs 32 and 33 output detection signals.

The ECU 16 determines the torsion angle of the torsion bar 23 based on the detection signals provided by the four Hall elements 50 and retrieved from the two Hall ICs 32 and 33. Specifically, upon retrieving the detection signals from the Hall elements 50, the ECU 16 uses a predetermined map to calculate the torsion angle of the torsion bar 23 corresponding to each of the detection signals. Furthermore, the ECU 16 calculates the steering torque T by multiplying the calculated torsion angle by a spring constant for the torsion bar 23.

Additionally, the ECU 16 has a function to detect an abnormality in the detection signal by comparing the torsion angles determined based on the detection signals with one another. According to the present embodiment, in the pair of magnetic collecting elements 29 and 30, at least a part of one 30b (30c) of the magnetic collecting protrusions 29b and 30b (29c and 30c) serving as the pair of magnetic collecting portions facing each other to provide the set B (C) is arranged in the cutout 40 (41) in the circuit board 31, as depicted in FIG. 7. Consequently, the distance D between the magnetic collecting protrusions 29b and 30b (29c and 30c) can be shortened. Therefore, the density of a magnetic flux passing through each of the Hall elements 50 can be increased, enabling an increase in detection accuracy.

Furthermore, not only is the distance D between the magnetic collecting protrusions 29b and 30b (29c and 30c) of the set B (C) reduced but the magnetic collecting protrusions 29b and 30b are also aligned with the magnetic collecting protrusions 29c and 30c in the board thickness direction Y of the circuit board 31. Thus, the torque sensor 17 can be downsized. Additionally, in each of the Hall ICs 32 and 33, the Hall elements 50 located to face the corresponding one of the cutouts 40 and 41 are arranged more toward the opening direction Z2 side of the corresponding one of the cutouts 40 and 41, which is the opposite side of the corresponding one of the cutouts 40 and 41 from the depth direction Z1 side. Therefore, the depth (depth dimension L) of each of the cutouts 40 and 41 can be reduced. This enables the torque sensor 17 to be downsized through a reduction in the size of the circuit board 31.

Each of the magnetic collecting elements 29 and 30 is formed of a press molded product. A slight variation occurs in the accuracy of alignment between the pair of magnetic collecting protrusions 29b and 30b and the pair of magnetic collecting protrusions 29c and 30c, which are formed by bending the magnetic collecting element main bodies 29a and 30a, respectively. To deal with this, the flank faces 42 defined by the chamfers are formed at the inlet of each of the cutouts 40 and 41 in the circuit board 31. Thus, regardless of the variation in the accuracy of alignment, interference between the magnetic collecting protrusions 29b and 30b (29c and 30c) and inner edges of the cutout 40 (41) can be suppressed.

Although not depicted in the drawings, each of the magnetic collecting elements is a press molded product including a circular-arc-shaped magnetic collecting element main body and a pair of magnetic collecting protrusions formed by bending the magnetic collecting element main body. In this case, a process is adopted in which, during manufacturing, magnetic collecting protrusions are formed by bending a flat elongate plate from which the magnetic collecting element main body is formed and then the elongate plate is curved into a circular arc form. In this case, in the press molded product, a variation in the accuracy of alignment between the pairs of magnetic collecting protrusions tends to increase. Also in this case, the flank faces 42 may be formed to allow suppression of interference between the magnetic collecting protrusions and the inner edges of the cutout.

The present invention is not limited to the above-described embodiment. In an electric power steering system of a type that transmits a driving force of an electric motor to a pinion shaft, the torque sensor may be arranged around the pinion shaft. In that case, the pinion shaft includes a first shaft coupled to an intermediate shaft, a second shaft forming a pinion, and a torsion bar that coaxially couples the first shaft and the second shaft together.

Various changes may be made to the present invention without departing from the scope of the present invention recited in the claims.

What is claimed is:
1. A torque sensor comprising:
a cylindrical multipolar magnet that rotates integrally with one of a first shaft and a second shaft coaxially arranged;
a pair of magnetic yokes arranged in a magnetic field from the multipolar magnet and rotating integrally with the other of the first shaft and the second shaft;
a pair of magnetic collecting elements each including at least one magnetic collecting portion, the magnetic collecting elements provided with at least a set of the magnetic collection portions that is formed of a pair of the magnetic collecting portions facing each other, and the magnetic collecting elements each magnetically coupled to corresponding one of the pair of magnetic yokes; and a magnetic flux detecting element including a circuit board with a cutout formed therein and a Hall IC that includes a Hall element arranged between the magnetic collecting portions, the Hall IC mounted parallel to the circuit board so as to extend over the cutout, the magnetic flux detecting element detecting a magnetic flux between the magnetic collecting portions, wherein at least a part of one of the magnetic collecting portions is arranged in the cutout, and flank faces defined by chamfers are formed at the inlet of the cutout so that the flank faces gradually increase a width of the cutout as the flank faces extend in a direction opposite of inserting the magnetic collecting portions into the cutout, wherein no portion of the circuit board is positioned between the Hall IC and the pair of magnetic collecting elements and the at least a part of one of the magnetic collecting portions extends into the cutout through the inlet and beyond the flank faces.

2. The torque sensor according to claim 1, wherein as the cutout, two cutouts are formed, as the Hall IC, two Hall ICs are provided which are arranged on an identical surface of the circuit board so as to each cover corresponding one of the cutouts, two sets of the magnetic collecting portions, each formed of the pair of the magnetic collecting portions, are provided, in the two sets of the magnetic collecting portions, the magnetic collecting portions on one side of the circuit board in a board thickness direction are at least partly arranged in the corresponding cutout, and in the board thickness direction of the circuit board, a position of the pair of the magnetic collecting portions of one of the two sets coincides with a position of the pair of the magnetic collecting portions of the other set.

3. The torque sensor according to claim 2, wherein each Hall IC includes a Hall element facing a respective one of the two cutouts; and a signal processing section that processes a signal received from each Hall element and outputs the processed signal, each Hall element is arranged more toward an opening direction side of the respective one of the two cutouts, which is the opposite side of the respective one of the two cutouts from a depth direction side, and at least a part of the signal processing section faces the circuit board.

4. An electric power steering system comprising:
the torque sensor according to claim 3.

5. An electric power steering system comprising:
the torque sensor according to claim 2.

6. The torque sensor according to claim 1, wherein the Hall IC includes a Hall element facing the cutout; and a signal processing section that processes a signal received from the Hall element and outputs the processed signal, the Hall element is arranged more toward an opening direction side of the cutout, which is the opposite side of the cutout from a depth direction side, and at least a part of the signal processing section faces the circuit board.

7. An electric power steering system comprising:
the torque sensor according to claim 3.

8. An electric power steering system comprising:
the torque sensor according to claim 1.

9. The torque sensor according to claim 1, wherein the circuit board comprises a protrusion positioned on a side of the circuit board and adjacent to the cutout, the protrusion extending a least a length of the cutout.

* * * * *